UNITED STATES PATENT OFFICE.

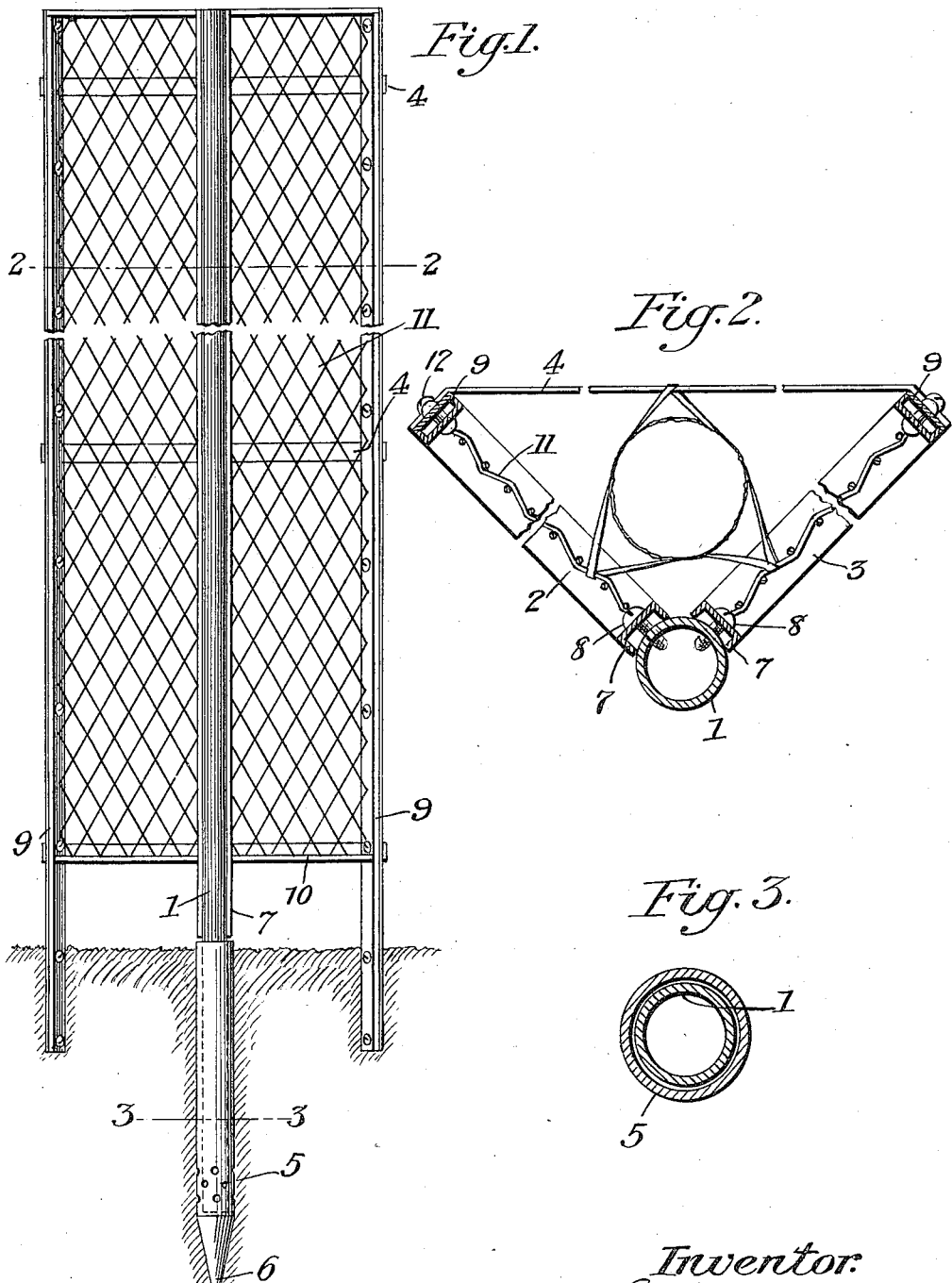

IRA CLIFFORD LANHAM, OF WASHINGTON, DISTRICT OF COLUMBIA, ASSIGNOR TO CHARLES J. O'NEILL, OF WASHINGTON, DISTRICT OF COLUMBIA.

TREE-GUARD.

1,031,941.  Specification of Letters Patent.  Patented July 9, 1912.

Application filed March 5, 1912. Serial No. 681,861.

*To all whom it may concern:*

Be it known that I, IRA CLIFFORD LANHAM, a citizen of the United States, residing at Washington, in the District of Columbia, have invented certain new and useful Improvements in Tree-Guards; and I do hereby declare the following to be a full, clear, and exact description of the invention, such as will enable others skilled in the art to which it appertains to make and use the same.

This invention relates to guards for trees and plants and has for its main object to provide such a device of novel construction, which will satisfactorily protect the tree or plant, both by guarding the same and also by furnishing means of support for the specimen of plant life which the guard envelops.

Heretofore no ornamental guard has been devised which furnished satisfactory means of support, and it has been shown in practice that a young tree must be supported in its growth, in order to insure good results. It has been proven that trees which have been sufficiently supported to prevent the winds from swaying the same and loosening their roots, have flourished 300% better than those which had no such support. There is a great demand for an ornamental guard which will furnish such support and give ample protection and which may be constructed from the minimum amount of material.

In view of this fact, a guard has been devised which preferably consists of two angularly disposed panels, secured at their adjacent edges to a supporting post, a portion of which is adapted to be set into the ground. The remote edges are connected by means of spaced straps in such a manner as to permit of complete accessibility to the interior of the structure.

The invention is set forth in the accompanying drawings, but various modifications can be made without departing from the spirit or scope of the invention.

In these drawings, Figure 1 is an elevation of a tree guard constructed in accordance with the invention. Fig. 2 is a sectional view taken on the line 2—2 of Fig. 1. Fig. 3 is a sectional view taken on the line 3—3 of Fig. 1.

In these various views, like reference characters refer to corresponding parts.

A supporting post 1, which is preferably a piece of hollow piping, has secured to its upper portion two panels 2 and 3. These panels are disposed radially with respect to the post and angularly with respect to each other, so that they will coöperate to form a pair of diverging members which partially envelop a central object. The remote edge of the panels are connected by means of appropriate cross ties or straps 4, spaced apart at suitable distances. The lower extremity of the post 1 extends a sufficient distance below the structure which it carries to allow it to be sunk into the ground. In order to facilitate this sinking, a sleeve 5 is provided, of sufficient internal diameter to receive the lower portion of the post. A pointed extremity 6 is preferably provided on the sleeve, which permits the sleeve to be readily driven in the ground when it is desired to erect a guard around a tree. The lower portion of the post is then inserted in the sleeve and the former is held rigidly in a vertical position.

The construction of the panels may vary, but preferably they consist of rectangular frames constructed of channel irons. One of the longitudinal side members 7 of each frame is adapted to be secured to the post by suitable means such as screws 8. The opposite side members 9 are preferably elongated to extend below the lower cross members 10 of the panel frames. They can thereby coöperate with the port 1 by being forced into the ground, to further steady the structure and to assist in supporting the panels. The protecting material 11 carried by the frames is preferably diamond mesh wire held in the frame by any suitable securing means. The cross-ties or braces 4 are preferably metallic and are secured to the channel irons 9 preferably by bolts 12. The three uprights or vertical supporting members—to wit—the post 1 and channel irons 9 form a triangular framework which is set into the ground as well shown in Fig. 1 to insure rigidity to the guard. The plant or tree can be braced within this structure by any suitable means connected to the cross-tie and to the other arms of the triangular structure. The tree or plant will therefore be sufficiently braced to prevent the wind from swaying the same to loosen the roots.

In the case of street trees the guard is so erected that the panels will be adjacent the street thereby protecting the trees from the usual injuries which their unprotected trunks are so liable to. The open portion formed by the remote edges of the panels will then be adjacent the sidewalk, and it is an easy matter to remove refuse from the base of the tree or to "work" the ground, around the roots as is very often necessary. It will be noted, however, that the tree trunk is also well protected on the side adjacent the walk as the straps or ties form a sufficient barricade for such purpose.

In erecting the guard it is only necessary to sink the sleeve adjacent the foot of the tree and to insert the post in the sleeve. It is evident that it can be easily removed and a new one substituted without disturbing the sunken sleeve. Preferably the sleeve or socket piece 5 is provided with lateral perforations to permit the escape of any water entering the socket and also to afford means for watering the roots of the tree to the best advantage by connecting the upper end of the hollow post 1 with a hose or other suitable water supply coupling. The water may be delivered through the post and its socket and then into the ground adjacent the tree roots.

What I claim is:—

1. A tree guard and support comprising paneling adapted to partially surround the tree trunk, and a rigid post secured to and extending substantially throughout the height of said paneling, said post having an elongated end to be set in the earth adjacent the tree.

2. A tree guard and support, comprising two panel sections adapted to partially surround the tree trunk, and a rigid post secured to adjacent vertical edges of said panels and having an elongated end to be set in the earth adjacent the tree.

3. A tree guard and support, comprising two angularly disposed panels composed of metal frames and lattice work, and a rigid post secured to adjacent vertical sides of the respective frames and having an elongated end to be set in the earth adjacent the tree.

4. A tree guard and support, comprising two angularly disposed panels composed of metal frames and lattice work, a rigid post secured to adjacent vertical members of the respective frames, and cross ties connecting the outer members of the frames.

5. A tree guard and support, comprising two angularly disposed panels composed of metal frames and lattice work, a rigid post secured to adjacent vertical members of the respective frames and having an elongated lower end, and a metal socket piece adapted to be set in the earth adjacent the tree to secure the lower end of the post.

In testimony whereof I affix my signature, in presence of two witnesses.

IRA CLIFFORD LANHAM.

Witnesses:
CHAS. J. O'NEILL,
VERNON S. HOUGHTON.

Copies of this patent may be obtained for five cents each, by addressing the "Commissioner of Patents, Washington, D. C."